(12) United States Patent
Kato et al.

(10) Patent No.: US 7,118,823 B2
(45) Date of Patent: Oct. 10, 2006

(54) AIRBREATHING FUEL CELL

(75) Inventors: Eiji Kato, Inuyama (JP); Yukio Naruse, Inuyama (JP); Noboru Owaki, Inuyama (JP); Shoji Nawa, Inuyama (JP); Yasuo Ido, Inuyama (JP)

(73) Assignee: Daido Metal Company, Nagoya (JP)

( * ) Notice: Subject to any disclaimer, the term of this patent is extended or adjusted under 35 U.S.C. 154(b) by 371 days.

(21) Appl. No.: 10/702,450

(22) Filed: Nov. 7, 2003

(65) Prior Publication Data

US 2004/0106033 A1 Jun. 3, 2004

(30) Foreign Application Priority Data

Nov. 21, 2002 (JP) ............................. 2002-337359

(51) Int. Cl.
*H01M 2/14* (2006.01)
*H01M 8/02* (2006.01)
*H01M 8/10* (2006.01)

(52) U.S. Cl. ..................... 429/38; 429/39; 429/34; 429/30; 429/32

(58) Field of Classification Search ............... 429/38, 429/39, 34, 30, 32
See application file for complete search history.

(56) References Cited

U.S. PATENT DOCUMENTS 5,595,834 A  1/1997  Wilson et al.

FOREIGN PATENT DOCUMENTS

JP  2002-270212  9/2002

*Primary Examiner*—Patrick Joseph Ryan
*Assistant Examiner*—Angela J. Martin
(74) *Attorney, Agent, or Firm*—Browdy and Neimark, PLLC

(57) ABSTRACT

An airbreathing fuel cell, in which a fuel can be adequately supplied to a cell part from outside even at low fuel pressures and air replacement can be easily performed to provide a stable power generating capacity, comprises a cell stack formed by stacking a plurality of those unit cells, which comprise a solid polymer electrolyte membrane, an oxygen passage plate and a fuel electrode, which are provided on both sides of the solid polymer electrolyte membrane to be opposed to each other, the oxygen passage plate provided adjacent and toward the oxygen electrode, and separator plates provided adjacent and outside the oxygen passage plate and the fuel electrode, the fuel distribution manifold being formed into a rod-shaped body having a polygonal-shaped cross section, a fuel supply passage formed in the tie bolt, and a plurality of fuel distribution passages provided to be communicated to the fuel supply passage and formed between central holes of the unit cells and an outer peripheral surface of the fuel distribution manifold.

9 Claims, 2 Drawing Sheets

AIRBREATHING FUEL CELL

BACKGROUND OF THE INVENTION

1. Technical Field

The present invention relates to a fuel cell usable for various usages such as electric sources and electric generators for outdoor, pleasure trip, household, business machines, or the like, and more particular, to an airbreathing fuel cell capable of supplying a sufficient amount of fuel into cells in a pollution-free polymer electrolyte fuel cell.

2. Background Art

Among fuel cells, a solid electrolyte fuel cells with hydrogen as a main fuel has been given attention and developed because of low working temperature and high power density (see, for example, Patent document 1 and Patent document 2).

As an example of such fuel cells, the inventors of the present application have proposed an airbreathing fuel cell, in which unit cells having a circular-shaped cross section are stacked (see Patent document 2). Concretely, a unit cell 10 comprises, as shown in an exploded figure in FIG. 3, an anode (fuel electrode) 13a and a cathode (oxygen electrode) 13b provided on both surfaces of a solid polymer electrolyte membrane 12, an oxygen passage plate 18 provided adjacent and toward the oxygen electrode, and separator plates 34 arranged outside the fuel electrode 13a and outside the oxygen passage plate 18 to unite these elements, and a plurality of such unit cells 10 are stacked together so as to provide a cell stack as hereinafter referred to "cell stack". In addition, the separator plates 34 are provided with terminals, through which electricity generated is taken out, and serve as collecting plates. Further, a fuel distribution manifold 32 communicated to the fuel electrodes 13a and composed of a sleeve of hydrophilic synthetic fiber yarns is provided to extend through central holes of the unit cells 10. And one nut 40 having fuel distribution passages 44 and the other nut 50 having a breeder valve 52 are screwed onto both ends of a tie bolt 26, which extends centrally through the fuel distribution manifold 32, end plates 24 are further provided to interpose end gaskets 28 between the end plates 24 and the separator plates 34, and the nuts interpose O-rings 36 between them and the end plates 24 to clamp and fix the unit cells integrally. Since such fuel cell can be made small in size and lightweight, it has been developed as a fuel cell of low power.

Also, such solid polymer electrolyte fuel cell is configured such that since a fuel is fed from a center of the one nut 40 through the fuel flow passages 44 as shown with dash lines in FIG. 3 to be supplied to the fuel electrodes 13a, the fuel is distributed through the hydrophilic synthetic fiber yarns sleeve of the fuel distribution manifold 32, which covers a periphery of the tie bolt 26.

[Patent document 1]
U.S. Pat. No. 5,595,834

[Patent document 2]
JP-A-2002-270212

However, with such conventional solid polymer electrolyte fuel cell, a fuel is supplied to the fuel electrodes 13a such that it is supplied to the fuel electrodes 13a radially from centers thereof through the sleeve of the fuel distribution manifold 32 from a side of the nut on a fuel supply side, and hydrogen having a small molecular size is supplied through a gap between central holes of the fuel electrodes 13a and an outer periphery of the sleeve of the fuel distribution manifold 32. Therefore, when used for a load, for which a comparatively large electric current is needed, it cannot be said that a flow rate of hydrogen supplied is adequate, and consequently a characteristic of power generation becomes unstable in some cases to cause an object of load to be insufficient in operation.

Also, with such airbreathing fuel cell, the sleeve serving as a fuel distribution manifold 32 is inserted between the tie bolt and central holes of the respective constituent members of the cell part at the time of assembly and there is a possibility that the respective constituent members of the cell part undergo out-of-center. That is, with a fuel distribution manifold such as a hydrophilic synthetic fiber sleeve, out-of-center can be decreased but positioning of centers cannot be adequately effected due to elasticity, and so such sleeve is not used in the case of accommodating for a load of low electric power, in which there is no need of taking account of generation of moisture. Therefore, out-of-center is generated at the time of assembly, an auxiliary member for assembly, corresponding to a fuel distribution manifold is needed, and it is necessary to take out the auxiliary member after positioning of the respective constituent members, so that there is caused that much time is taken and a careful work is needed so as not to cause damage to the cell part in taking out the auxiliary member.

SUMMARY OF THE INVENTION

The invention has been thought of in view of the problem, and has its object to provide an airbreathing fuel cell, in which a fuel can be adequately supplied to a cell part from outside even at a low fuel pressure and replacement with an air can be easily made to obtain a stable power generating performance.

Also, another object of the invention is to provide an airbreathing fuel cell, in which a fuel distribution manifold is made use of to position respective constituent members of a cell stack at the time of assembly in a manner to eliminate out-of-center.

To attain the above object, an airbreathing fuel cell according to an embodiment of the invention comprises a cell stack formed by stacking a plurality of those unit cells, which comprise a solid polymer electrolyte membrane, an oxygen electrode and a fuel electrode, which are provided on both sides of the solid polymer electrolyte membrane to be opposed to each other, an oxygen passage plate provided adjacent and toward the oxygen electrode, and separator plates provided adjacent and outside the oxygen electrode and the fuel electrode, the fuel distribution manifold being formed into a rod-shaped body having a polygonal-shaped cross section, a fuel supply passage formed in the tie bolt, and a plurality of fuel distribution passages provided to be communicated to the fuel supply passage and formed between central holes of the unit cells and an outer peripheral surface of the fuel distribution manifold.

With the airbreathing fuel cell, since the fuel distribution manifold is formed into a rod-shaped body having a polygonal-shaped cross section, and the fuel distribution passages are provided between the central holes of the unit cells and the outer peripheral surface of the fuel distribution manifold such that the plurality of fuel distribution passages compartmented by corner portions of a polygon are formed on the respective unit cells of the cell stack to be defined between surfaces of the rod-shaped body, which has a polygonal-shaped cross section and is inserted into substantially circular-shaped central holes of the unit cells, and the central holes of the unit cells, a sufficient amount of a fuel can be supplied to the cell stack through the fuel distribution passages, and also in the case of being used for a load, for which a comparatively large current is needed, it is possible to stably generate electric power and to adequately supply electricity to a load.

Also, with the airbreathing fuel cell according to the embodiment, since the fuel distribution manifold has a polygonal-shaped cross section, corners of the polygonal-shaped cross section and inner peripheries of the central holes make it possible to properly arrange respective constituent members of the unit cells and to position centers of the members when the fuel distribution manifold is inserted into the central holes of the unit cells in assembly. Since it is unnecessary to dismount the fuel distribution manifold usable in positioning of the centers, assembly of high accuracy can be done without damage to products.

Another embodiment of the invention adds to the airbreathing fuel cell a feature that the fuel distribution manifold comprises radial cut grooves formed on both axial ends thereof, and a fuel is supplied to the unit cells through the cut grooves and the fuel distribution passages from an end of the fuel distribution manifold.

Such fuel distribution manifold is provided on both ends thereof with radial cut grooves, a fuel is supplied to the fuel distribution passages through the cut grooves communicated to the fuel supply passage, and an inside air can be quickly deaerated by opening of a breeder valve when supplying of a fuel is started, so that it is possible to smoothly supply a fuel to the cell stack.

Further, a further embodiment of the invention adds to the airbreathing fuel cell a feature that the fuel supply passage in the tie bolt extends from both ends of the tie bolt to positions on both ends of the cell stack along a central axis of the tie bolt and radially in the positions on both ends of the cell stack to be communicated to the fuel distribution passages.

According to the further embodiment, the fuel supply passage communicated to the fuel distribution passages on one end of the fuel distribution manifold is provided to extend from one end of the tie bolt to one end of the cell stack along a central axis of the tie bolt and to extend radially outward therefrom to be communicated to the fuel distribution passages, so that a fuel supplied from the end of the tie bolt can be supplied to the end of the fuel distribution manifold. A fuel supplied to that position on the tie bolt, which corresponds to one end of the fuel distribution manifold is conducted radially outward to be supplied to the outer peripheral surface of the tie bolt and the one end of the fuel distribution manifold, and then the fuel can be smoothly and adequately supplied to the other end of the cell stack through the fuel distribution passages. At that time, the fuel supply passage is communicated at the other end to the breeder valve to be made use of for deaeration of an air at the start, thus enabling promptly filling a fuel into the fuel distribution passages.

Also, the still further embodiment of the invention adds to the airbreathing fuel cell a feature that the fuel distribution passages have a substantially sector-shaped cross section and extend axially along the fuel distribution manifold.

According to the still further embodiment of the invention, the axially extending fuel distribution passages having a comparatively large and substantially sector-shaped cross section and defined by the central holes of the unit cells having a circular-shaped cross section and corners of the fuel distribution manifold having a substantially polygonal-shaped cross section make it possible to make a fuel flow smooth and large in flow rate, so that it is possible to ensure flow passages for accommodating for fluctuations caused in current load and supplying a fuel.

DESCRIPTION OF THE PREFERRED EMBODIMENTS

Embodiments of the invention will be described in detail below with reference to the drawings.

Figure 1A:
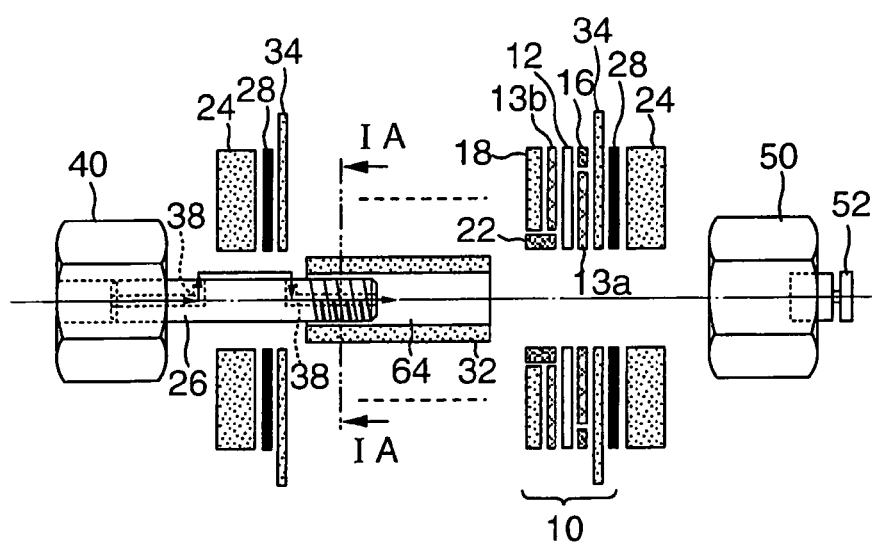
FIGS. 1A and 1B show an airbreathing fuel cell according to an embodiment of the invention, FIG. 1A being an exploded, partially cross sectional view showing the airbreathing fuel cell, and FIG. 1B being a cross sectional view taken along the line IA–IA in FIG. 1A.
Figure 1B:
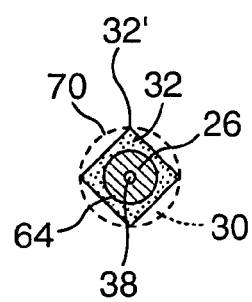
Figure 2A:
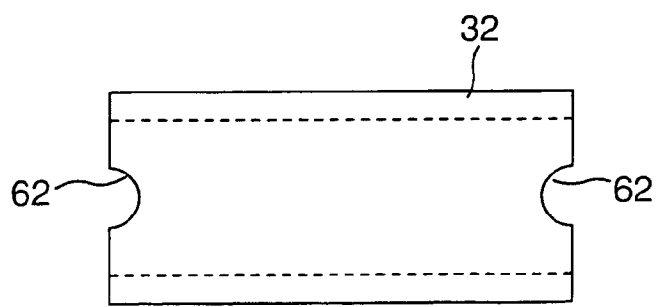
FIGS. 2A and 2B show the fuel distribution manifold in FIGS. 1A and 1B, FIG. 2A being a front view, and FIG. 2B being a side view.
Figure 2B:
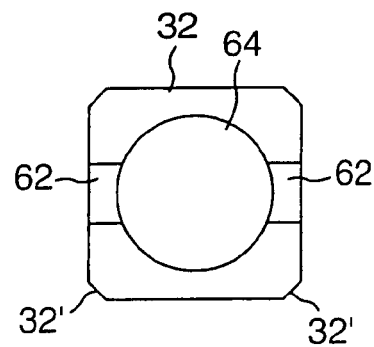
Figure 3:
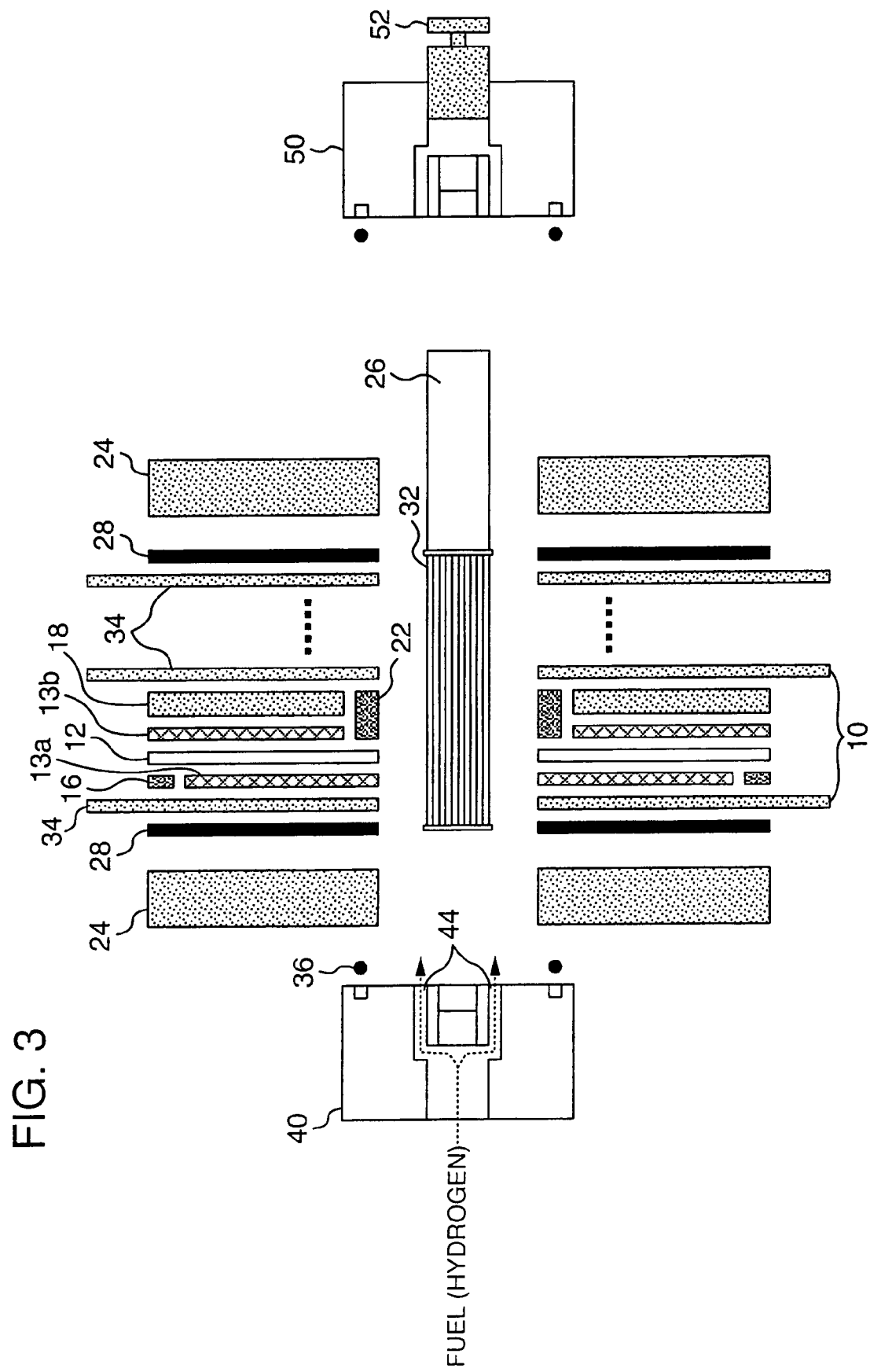
FIG. 3 is an exploded, cross sectional view showing a prior airbreathing fuel cell.

Referring to FIGS. 1A, 1B and 2A, 2B, FIG. 1A is an exploded, partially cross sectional view showing an airbreathing fuel cell according to an embodiment of the invention, and FIGS. 2A and 2B are a front view and a side view showing a fuel distribution manifold used in the airbreathing fuel cell. In the airbreathing fuel cell shown in these figures, members having the same constitution as that of conventional ones shown in FIG. 3 are denoted by the same reference numerals and described. With the airbreathing fuel cell, a plurality of single cells 10, respectively, constituting a cell stack are conventionally configured as shown in FIG. 3, and comprise an oxygen passage plate 18 interposed between an oxygen electrode 13$b$ supported by an inner seal 22 and a separator plate 34.

Also, the oxygen passage plates 18 are made of a carbon plate, and the oxygen passage plates 18 and the oxygen electrodes 13$b$ are formed with central holes 70, through which a fuel distribution manifold 32 extends, and supported on a tie bolt 26 through the fuel distribution manifold 32 and the inner seal 22.

The fuel distribution manifold 32 is made of a thermoplastic resin, for example, polyacetal resin, and formed into a rod-shaped body to be rectangular in cross section as shown in FIG. 2B. The fuel distribution manifold has a through-hole 64, through which the tie bolt 26 extends, and in a state, in which the fuel distribution manifold is assembled in the single cells 10, a power generating cell stack composed of a plurality of unit cells 10 is provided to be positioned between both ends of the fuel distribution manifold 32.

Provided on the both ends of the fuel distribution manifold 32 are cut grooves 62, 62 having a semi-circular cross section and extending perpendicular to and through an axis as shown in FIG. 2A. These cut grooves 62, 62 align with a fuel supply passage 38, which extends radially outwardly of the tie bolt 26, and are provided not to plug the fuel supply passage 38 to obstruct communication of the fuel supply passage with fuel distribution passages 30 even if both the nuts 40, 50 are screwed to the tie bolts 26 to thereby put the power generation cell stack between the end plates 24 so as to clamp the cell stack thosebetween.

In a state, in which the fuel distribution manifold 32 is inserted into the central holes 70 of the unit cells 10 and the end plates 24 of the unit cell, corners 32' of the fuel distribution manifold 32 contact with inner wall surfaces of the central holes 70 as shown in FIG. 1B to define four fuel distribution passages 30 having a substantially sector-shaped cross section. Accordingly, the fuel distribution passages 30 are large in cross sectional area to be able to provide a sufficient flow rate as a flow passage for a fuel.

Further, when a fuel cell is assembled, the fuel distribution manifold 32 is used to center the separator plates 34, fuel electrodes 13a, solid polymer electrolyte membranes 12, oxygen electrodes 13b, oxygen passage plates 18, inner seals 22, or the like of the unit cells 10, which constitute a cell stack, and inner peripheries of the central holes 70 contact with the corners 32' to be able to perform positioning as shown in FIG. 1B. Being left intact, the fuel distribution manifold 32 has the tie bolt 26 extending through the through-hole 64, a cell stack is interposed between the end plates 24, and the nuts 40, 50 are screwed onto both ends of the tie bolt 26 to be fastened, thereby enabling assembling a fuel cell.

In the fuel cell constituted in the above manner, a fuel supplied from the fuel supply passage 38 in the end of the tie bolt 26 on a side of one 40 of the nuts is supplied axially to a position on an end of the cell stack to pass by way of the supply passage 38, which extends radially from the position, and through the cut grooves 62 on the end of the fuel distribution manifold 32 to be supplied to the fuel distribution passages 30 defined between the central holes 70 of the cell stack and an outer periphery of the fuel distribution manifold 32. And the fuel supplied to the fuel distribution passages 30 is absorbed by the fuel electrodes 13a in the respective unit cells 10 to afford a power generating action due to chemical reactions in the solid polymer electrolyte membranes 12 and the oxygen electrodes 13b.

Since the fuel distribution passages 30 is communicated to the breeder valve 52 provided on the other 50 of the nuts through the cut grooves 62 on the other end of the fuel distribution manifold 32 and the fuel supply passage 38 extending radially inwardly of and axially outwardly of the tie bolt 26, an air having accumulated in the fuel distribution passages 30 and the fuel supply passage 38 can be deaerated by the breeder valve 52 at the start of power generation in the fuel cell. Thereby, a fuel is quickly supplied to the cell stack at the start of the fuel cell to enable immediately starting power generation.

In the airbreathing fuel cell making use of the fuel distribution manifold 32 constituted in the above manner, the fuel distribution manifold 32 is formed to be rectangular in cross section to define four fuel distribution passages 30, having a substantially sector-shaped cross section, between the central holes 70 of the cell part, which constitutes the cell stack, and the outer periphery of the fuel distribution manifold 32, so that the flow passages can be made large in cross sectional area to provide a sufficient fuel flow and a fuel can be supplied correspondingly even when there are generated fluctuations due to an increase in current supply for a load.

In addition, while the fuel distribution manifold 32 constituted in the above manner is formed into a rod-shaped body having a rectangular-shaped cross section, it may be formed to be polygonal in cross section other than rectangular unless there is involved any inconvenience in centering at the time of assembly.

As described above, the airbreathing fuel cell according to the invention produces the following effects owing to the above constitution.

In the airbreathing fuel cell, the fuel distribution manifold is formed into a rod-shaped body having a polygonal-shaped cross section, a fuel supply passage is formed in the tie bolt, and a plurality of fuel distribution passages are provided to be communicated to the fuel supply passage and formed between central holes of the unit cells and an outer peripheral surface of the fuel distribution manifold, so that the fuel distribution passages can be made large in cross sectional area and in volume for a fuel flow passage. Thereby, there is produced an excellent effect that even in the case of an increase in electric power generation, it is possible to adequately supply a fuel, thus accommodating for fluctuations in a load on the fuel cell.

Also, when a fuel cell is assembled, the fuel distribution manifold makes it possible to effect centering by matching corners having a polygonal-shaped cross section with inner peripheries of the central holes in the fuel electrodes, solid polymer electrolyte membranes, oxygen electrodes, oxygen passage plates, or the like of the cell stack, so that without the use of any specific auxiliary tool, it is possible to easily assemble the power generating cell stack and to avoid damage or the like at the time of assembly.

Also, in the airbreathing fuel cell, cut grooves are provided on both ends of the fuel distribution manifold to provide communication between the fuel supply passage and the fuel distribution passages, whereby the fuel supply passage is communicated to both ends of the tie bolt to enable not only adequately supplying a fuel to the fuel distribution passages but also quickly deaerating an air present in the fuel distribution passages and the fuel supply passage owing to communication between the both passages when the fuel cell is started.

Further, according to the further embodiment, the fuel supply passage extends along a central axis of the tie bolt from both ends of the tie bolt to positions on both ends of the power generating cell stack and radially outward in the positions to be communicated to the fuel distribution passages, so that the fuel supply passage can be communicated to a nut provided with a breeder valve to produce an excellent effect that the breeder valve enables immediately deaeration when the fuel cell is started.

Also, the fuel distribution passages defined by an outer peripheral surface of the fuel distribution manifold having a polygonal shape and an inner periphery of the central hole of the power generating cell stack are formed to be substantially sector-shaped in cross section, so that the fuel distribution passages can be made large in cross sectional area and a fuel can be adequately supplied to the cell stack to accommodate for fluctuations in a load on the fuel cell.

What is claimed is:
1. An airbreathing fuel cell comprising
    end plates,
    a unit cell disposed between the two end plates,
    a fuel distribution manifold disposed centrally of the unit cell to supply a fuel to the unit cell,
    a single tie bolt extending centrally through the fuel distribution manifold and through the unit cell to untie these elements,
    fixing nuts screwed onto both ends of the tie bolt to integrally clamp the unit cell between the end plates, and
    a cell stack formed by stacking a plurality of said unit cells, which comprise a solid polymer electrolyte membrane, an oxygen passage plate and a fuel electrode, which are provided on both sides of the solid polymer electrolyte membrane to be opposed to each other, the oxygen passage plate provided adjacent and toward the oxygen electrode, and
    separator plates provided adjacent and outside the oxygen passage plate and the fuel electrode, and wherein the fuel distribution manifold is formed into a rod-shaped body having a polygonal-shaped cross section, a fuel supply passage is formed in the tie bolt, and a plurality of fuel distribution passages are provided to be communicated to the fuel supply passage and formed between central holes of the unit cells and an outer peripheral surface of the fuel distribution manifold.

2. The airbreathing fuel cell according to claim 1, wherein the fuel distribution manifold comprises radial cut grooves formed on both axial ends thereof, and a fuel is supplied to the unit cells through the cut grooves and the fuel distribution passages from an end of the fuel distribution manifold.

3. The airbreathing fuel cell according to claim 1, wherein the fuel supply passage in the tie bolt extends from both ends of the tie bolt to positions on both ends of the cell stack along a central axis of the tie bolt and radially in the positions on both ends of the cell stack to be communicated to the fuel distribution passages.

4. The airbreathing fuel cell according to claim 2, wherein the fuel supply passage in the tie bolt extends from both ends of the tie bolt to positions on both ends of the cell stack along a central axis of the tie bolt and radially in the positions on both ends of the cell stack to be communicated to the fuel distribution passages.

5. The airbreathing fuel cell according to claim 1, wherein the fuel distribution passages have a substantially sector-shaped cross section and extend axially along the fuel distribution manifold.

6. The airbreathing fuel cell according to claim 2, wherein the fuel distribution passages have a substantially sector-shaped cross section and extend axially along the fuel distribution manifold.

7. The airbreathing fuel cell according to claim 3, wherein the fuel distribution passages have a substantially sector-shaped cross section and extend axially along the fuel distribution manifold.

8. The airbreathing fuel cell according to claim 4, wherein the fuel distribution passages have a substantially sector-shaped cross section and extend axially along the fuel distribution manifold.

9. The airbreathing fuel cell of claim 1, further comprising O-rings between the end plates and the unit cell.

* * * * *